(12) United States Patent
Adachi

(10) Patent No.: US 8,107,205 B2
(45) Date of Patent: Jan. 31, 2012

(54) CURRENT DIFFERENTIAL RELAY

(75) Inventor: Keigo Adachi, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 324 days.

(21) Appl. No.: 12/575,496

(22) Filed: Oct. 8, 2009

(65) Prior Publication Data

US 2010/0302697 A1 Dec. 2, 2010

(30) Foreign Application Priority Data

Jun. 1, 2009 (JP) ................................ 2009-132474

(51) Int. Cl.
*H02H 3/00* (2006.01)
(52) U.S. Cl. .......................................... 361/87; 361/68
(58) Field of Classification Search ............... 361/62–69, 361/87
See application file for complete search history.

(56) References Cited

U.S. PATENT DOCUMENTS

| | | | | |
|---|---|---|---|---|
| 5,576,625 A | * | 11/1996 | Sukegawa et al. | 324/424 |
| 6,678,134 B2 | * | 1/2004 | Sugiura et al. | 361/68 |
| 2002/0057544 A1 | | 5/2002 | Sugiura et al. | |

FOREIGN PATENT DOCUMENTS

| | | |
|---|---|---|
| JP | 5-42209 B2 | 6/1993 |
| JP | 2001-52280 A | 2/2001 |
| JP | 2002-186166 A | 6/2002 |
| JP | 2006-300963 A | 11/2006 |
| JP | 2008-61451 A | 3/2008 |

OTHER PUBLICATIONS

Combined Search and Examination Report issued in the corresponding United Kingdom Patent Application No. 0918125.6 dated Feb. 17, 2010.

* cited by examiner

*Primary Examiner* — Danny Nguyen
(74) *Attorney, Agent, or Firm* — Buchanan Ingersoll & Rooney PC

(57) ABSTRACT

An output unit outputs a trip current based on current amount data obtained by sampling a current amount at a first end of a power line at a predetermined timing and current amount data received from a device at a second end of the power line. A clock generating unit generates a clock to be used as a reference for the predetermined timing. A receiving unit receives a GPS signal and extracts a time synchronization signal from the GPS signal. A correction-signal generating unit generates a correction signal for synchronizing the clock with the time synchronization signal. A correcting unit corrects the clock with the correction signal.

4 Claims, 3 Drawing Sheets

CURRENT DIFFERENTIAL RELAY

BACKGROUND OF THE INVENTION

1. Field of the Invention

The present invention relates to a current differential relay that executes a power-line protection in a protected section of a power system by using a signal transmission line between the both sides of the protected section.

2. Description of the Related Art

To protect a power line of a power system, a pulse code modulation (PCM) current differential relay is arranged at each end (an electric power station such as a substation) of a protected section. Each PCM current differential relay samples a power-line current at a first end at regular intervals, and transmits obtained data of the first end to a second end by using a PCM signal transmission line. The PCM current differential relay then acquires data of a second end, executes ratio differential computation by using each data of the first end and the second end, obtains a differential current, and determines presence or absence of a power-line failure within the protected section. As a result of the determination, if a power-line failure is detected in the protected section, each PCM current differential relay is configured to protect the power line in the protected section by tripping a breaker at the first end and disconnecting the power line in the protected section from the power system.

In such case, timings of sampling a power-line current needs to be simultaneous between a device at the first end and a device at the second end. For this reason, conventionally, various methods have been proposed for synchronizing sampling timings between a device at the first end and a device at the second end.

Japanese Patent Publication No. H5-42209 (FIG. 1) describes a technology of synchronizing sampling timings based on timings of transmitting and receiving a signal at each of the first end device and the second end device. In other words, according to Japanese Patent Publication No. H5-42209 (FIG. 1), a signal is transmitted from the first end device to the second end device at regular intervals synchronized with the sampling timings. The second end device obtains a time difference between a receiving time point of the signal and a sampling timing immediately before the receiving time point, and transmits the time difference to the second end device. The first end device synchronizes sampling timings based on the time difference information and a timing of receiving the time difference information by the first end device.

According to the technology of Japanese Patent Publication No. H5-42209 (FIG. 1), under the assumption that a transmission delay time of a signal from the first end device to the second end device is equal to the transmission delay time of a signal from the second end device to the first end device, synchronization is established.

However, a general PCM transmission device transmits a PCM signal by multiplexing it, so that a transmission delay time is determined in accordance with a multiplexing timing. Moreover, the multiplexing timing is determined in accordance with the start of a transmission by the PCM transmission device, consequently, when a power short break or a channel switching of the PCM transmission device occurs, the transmission delay time changes.

For this reason, to synchronize the sampling timing by using the method according to Japanese Patent Publication No. H5-42209 (FIG. 1), it needs to prepare a PCM transmission device that is specially configured to have a constant transmission delay time, and to make the mutual transmission delay time equal between the first end device and the second end device. Such a PCM transmission device is expensive, and the application of the PCM transmission device to a current differential relay results in a high cost on the system.

To solve such problem, conventionally a technology of synchronizing the sampling timing of a current differential relay by using a time synchronization signal of a global positioning system (GPS) has been proposed.

For example, Japanese Patent Application Laid-open No. 2002-186166 (FIG. 1) describes a technology configured to synchronize sampling by measuring a difference between a pulse of a predetermined cycle received by a GPS receiver (hereinafter, "GPS time-synchronization signal") and a sampling pulse output by a sampling pulse generating unit, and correcting the sampling pulse output by the sampling pulse generating unit based on the timing difference. According to Japanese Patent Application Laid-open No. 2002-186166 (FIG. 1), to synchronize a sampling pulse to a signal transmitted from a GPS satellite, sampling timings can be synchronized between current differential relays without influence of a transmission delay during a data transmission.

Furthermore, as a countermeasure to an interruption of a GPS time-synchronization signal, Japanese Patent Application Laid-open No. 2002-186166 (FIG. 1) proposes methods, for example, making a differential current close to substantially zero or the value of a differential current before the interruption of the GPS time-synchronization signal, or performing sampling synchronization processing based on a transmission delay time that is measured in advance and a present data-receiving timing.

When synchronizing the sampling timing by using a GPS time-synchronization signal, for example, it needs to prepare a method of securing synchronization of the sampling timing when a GPS time-synchronization signal turns abnormal because a GPS signal cannot be received, for example, due to a receiving error.

According to Japanese Patent Application Laid-open No. 2002-186166 (FIG. 1), to secure synchronization of the sampling timing in such case, it needs to perform processing that is different to a large extent from a case of normally receiving a GPS time-synchronization signal, for example, processing of making a differential current between currents at the both ends substantially zero as described above, processing of making a phase difference between currents at the both ends substantially zero, or processing of correcting the sampling timing based on a transmission delay time that is measured during a period while the GPS time-synchronization signal is normal. As described above, according to Japanese Patent Application Laid-open No. 2002-186166 (FIG. 1), because synchronization processing is substantially different between a normal case and an abnormal case of the GPS time-synchronization signal, there is a problem that processing becomes complicated.

In addition, because current information, such as a differential current and a current phase difference, greatly changes when an internal failure occurs inside a power line, the current information needs to be fixed to current information in a state before the failure occurs in order to avoid influence of the change on a sampling frequency. For this reason, there is a problem that processing becomes complicated and unreliable because it needs to confirm conditions under which no failure is found in the system by using another failure detecting unit.

SUMMARY OF THE INVENTION

It is an object of the present invention to at least partially solve the problems in the conventional technology.

According to one aspect of the present invention, there is provided a current differential relay including an output unit that outputs a trip current based on current amount data obtained by sampling a current amount at a first end of a power line to be protected at a predetermined timing and current amount data received from a device at a second end of the power line; a clock generating unit that generates a clock to be used as a reference for the predetermined timing; a receiving unit that receives a global positioning system signal and extracts a time synchronization signal from the global positioning system signal; a correction-signal generating unit that generates a correction signal for synchronizing the clock with the time synchronization signal; and a correcting unit that corrects the clock with the correction signal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below in detail with reference to the accompanying drawings. However, the present invention is not limited by the following embodiments.

Figure 1:
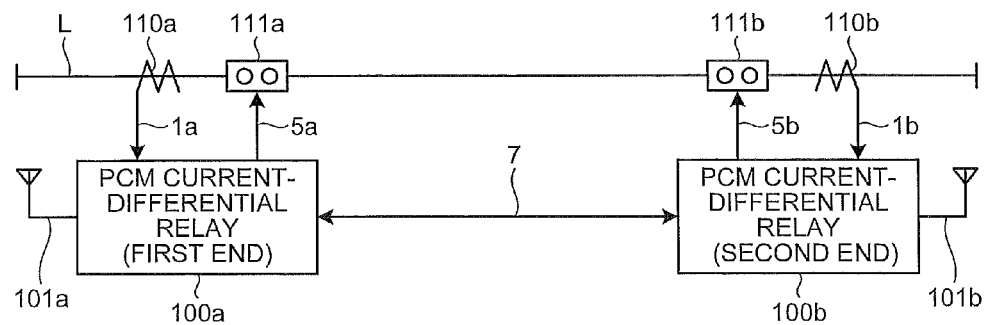
FIG. 1 is a schematic diagram of an example of a system to which a current differential relay according to an embodiment of the present invention can be applied.

First of all, to simplify an understanding, a brief explanation of a system that uses a current differential relay is given below prior to explanations of the embodiments according to the present invention. FIG. 1 is a schematic diagram of an example of a system to which a current differential relay according to each embodiment of the present invention can be applied. According to FIG. 1, PCM current-differential relays 100a and 100b are installed at respective ends of a protected section of a power line L.

A trip signal 5a output from the PCM current-differential relay 100a installed at one end of the power line L is connected to a breaker 111a installed on the power line L via a not-shown contact. Furthermore, the PCM current-differential relay 100a is connected to the power line L via a current transformer 110a provided on the power line L. The PCM current-differential relay 100b installed at the second end of the power line L is also connected similarly to the PCM current-differential relay 100a. Precisely, the PCM current-differential relay 100b is connected to the power line L via a current transformer 110b as well as a trip signal 5b is connected to a breaker 111b installed on the power line L via a not-shown contact.

The PCM current-differential relays 100a and 100b include antennas 101a and 101b, respectively, for receiving a radio wave from a global positioning system (GPS) satellite, and a not-shown GPS receiving unit. For example, the PCM current-differential relay 100a corrects a sampling timing of sampling an output signal 1a of the current transformer 110a based on a GPS time-synchronization signal included in a radio wave from a GPS satellite that is received by the antenna 101a. The PCM current-differential relay 100a then transmits current data obtained by sampling the output signal 1a of the current transformer 110a in accordance with the corrected sampling timing, to the PCM current-differential relay 100b at the second end of the power line L via a transmission line 7.

The PCM current-differential relay 100b also performs the processing similarly to the PCM current-differential relay 100a, and transmits current data to the PCM current-differential relay 100a via the transmission line 7.

For example, the PCM current-differential relay 100a compares the current data obtained by the PCM current-differential relay 100a with the current data transmitted from the PCM current-differential relay 100b. When a difference exceeds a threshold, the PCM current-differential relay 100a determines that there is a trouble, and transmits the trip signal 5a to the breaker 111a. Receiving the trip signal 5a, the breaker 111a interrupts the current running through the power line L. The PCM current-differential relay 100b also performs similar processing.

First Embodiment

Figure 2:
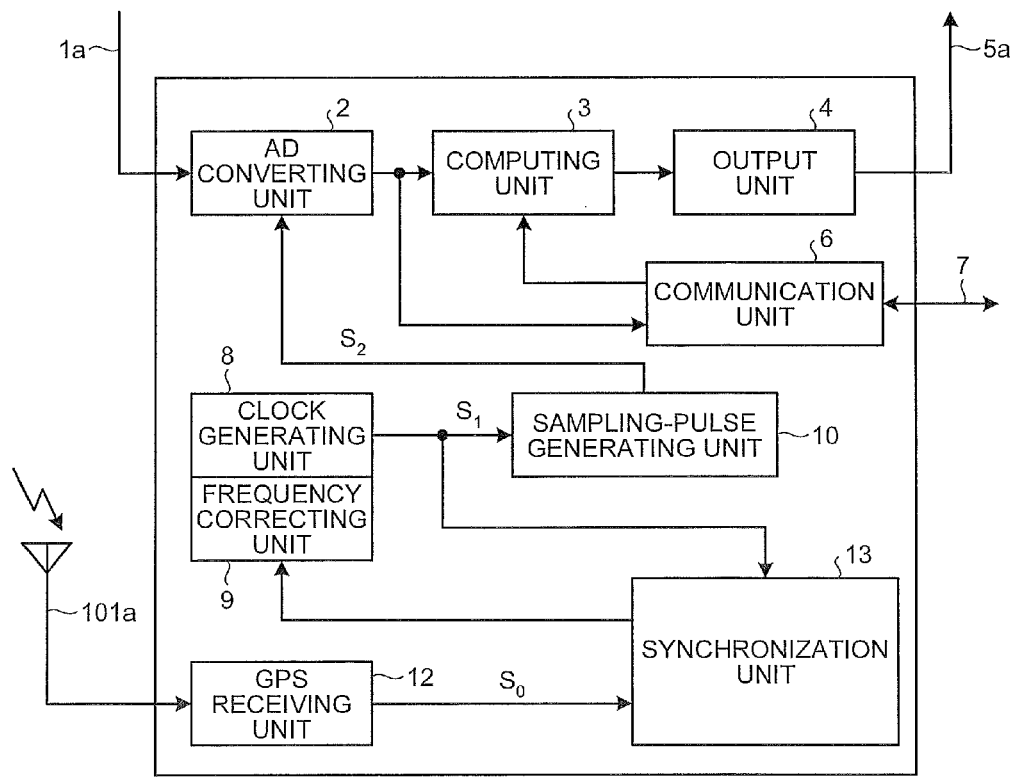
FIG. 2 is a block diagram of an example of a Pulse Code Modulation (PCM) current differential relay according to a first embodiment of the present invention.

A PCM current differential relay according to a first embodiment of the present invention is explained below in detail with reference to the drawings. FIG. 2 depicts an example configuration of the PCM current-differential relay 100a according to the first embodiment. The PCM current-differential relay 100b can be implemented by a configuration similar to that of the PCM current-differential relay 100a, therefore explanation of it is omitted below.

The output signal 1a as an analog signal from the current transformer 110a at the first end is sampled by an analog-to-digital (AD) converting unit 2 with the timing of a sampling pulse $S_2$ output from a sampling-pulse generating unit 10, and then converted into current amount data as a digital signal. The current amount data is supplied to each of a computing unit 3 and a communication unit 6.

The communication unit 6 modulates the supplied current amount data to, for example, a pulse code modulation (PCM) signal, and then transmits it to the PCM current-differential relay 100b via the transmission line 7. Moreover, the communication unit 6 receives a PCM signal that is modulated at the PCM current-differential relay 100b from current amount data based on an output signal 1b of the current transformer 110b and transmitted via the transmission line 7. The received PCM signal is demodulated to current amount data and supplied to the computing unit 3.

The computing unit 3 performs a predetermined computation by using the current amount data based on the output signal 1a of the current transformer 110a at the first end supplied from the AD converting unit 2 and the current amount data based on the output signal 1b of the current transformer 110b at the second end, and supplies a computation result to an output unit 4. The output unit 4 outputs the trip signal 5a based on the supplied computation result.

On the other hand, a GPS signal transmitted from the GPS satellite, which is not shown, is received by the antenna 101a, and supplied to a GPS receiving unit 12. The GPS receiving unit 12 extracts a GPS time-synchronization signal from the supplied GPS signal. The GPS time-synchronization signal is called a pulse per second (PPS) signal, which is a pulse per second with precision to 1 microsecond. The GPS receiving unit 12 outputs a pulse $S_0$ synchronized with the GPS time-synchronization signal (hereinafter, "GPS pulse $S_0$"). The GPS pulse $S_0$ is supplied to a synchronization unit 13.

The synchronization unit 13 compares a clock $S_1$ output from a clock generating unit 8, which will described later, with the GPS pulse $S_0$, and then generates a correction signal for synchronizing the clock $S_1$ with the GPS pulse $S_0$ based on a comparison result. The correction signal is supplied to a frequency correcting unit 9.

On the other hand, the clock generating unit 8 generates the clock $S_1$ that is to be a reference when the sampling-pulse generating unit 10 generates the sampling pulse $S_2$. When generating the clock $S_1$, the frequency correcting unit 9 corrects the clock $S_1$ generated by the clock generating unit 8 so as to be synchronized with the GPS time-synchronization signal based on the correction signal supplied from the synchronization unit 13. The clock $S_1$ that is corrected based on the correction signal is supplied to the sampling-pulse generating unit 10. The sampling-pulse generating unit 10 generates the sampling pulse $S_2$ of a timing that is synchronized with the GPS time-synchronization signal based on the clock $S_1$ supplied from the clock generating unit 8, and then supplies it to the AD converting unit 2.

Figure 3:
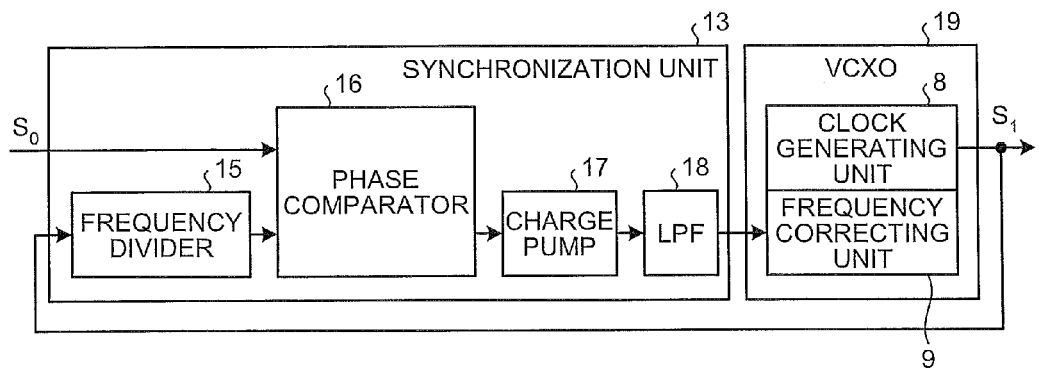
FIG. 3 is a block diagram for explaining an example method of correcting a clock $S_1$ based on a clock $S_0$.

An example method of correcting the clock $S_1$ based on the clock $S_0$ is explained below with reference to FIG. 3. FIG. 3 is an example of a case where the clock $S_1$ is generated by a phase locked loop (PLL) that includes the synchronization unit 13 and a voltage controlled crystal oscillator (VCXO) 19 used as the clock generating unit 8. The VCXO 19 is configured capable to control the frequency of a clock generated by the clock generating unit 8 in accordance with the voltage of a signal input into the frequency correcting unit 9.

The clock $S_1$ generated by the clock generating unit 8 is input into a frequency divider 15, divided into the same frequency as the GPS pulse $S_0$, and input to one of input ends of a phase comparator 16. To the other of the input ends of the phase comparator 16, the GPS pulse $S_0$ supplied from the GPS receiving unit 12 is input.

The phase comparator 16 compares the phase of an output signal of the frequency divider 15 input to the one of the input ends and the phase of the GPS pulse $S_0$ input to the other of the input ends, and outputs a phase differential signal. The differential signal output from the phase comparator 16 is supplied to a charge pump 17. The charge pump 17 outputs a pulse in accordance with the supplied differential signal and supplies it to a low pass filter (LPF) 18.

The LPF 18 extracts a direct current (DC) component from the supplied pulse, and supplies it to the frequency correcting unit 9 of the VCXO 19. The clock frequency of the clock $S_1$ generated by the clock generating unit 8 is controlled by the frequency correcting unit 9 based on the DC component supplied from the LPF 18. As a result, the clock $S_1$ is converged on a timing on the basis of the GPS pulse $S_0$, so that synchronization between the clock $S_1$ and the GPS pulse $S_0$ is established.

As the sampling-pulse generating unit 10 generates the sampling pulse $S_2$ in synchronism with the clock $S_1$, the sampling pulse $S_2$ can be synchronized with the GPS time-synchronization signal.

In this way, according to the PCM current-differential relay 100a, the frequency correcting unit 9 is provided in the clock generating unit 8 that generates the clock $S_1$ to be a reference for the sampling pulse $S_2$ with which the output signal 1a of the current transformer 110a is to be sampled. The frequency correcting unit 9 corrects the frequency of the clock $S_1$ so as to synchronize the sampling pulse $S_2$ with the GPS time-synchronization signal included in the GPS signal transmitted from the GPS satellite.

Accordingly, sampling synchronization using the GPS time-synchronization signal can be achieved through simple processing. Moreover, because the processing is simple, the reliability of the processing is high. Furthermore, when the synchronization unit 13 is configured to use the PLL, the synchronization processing can be configured as like hardware, to that a computation load of the synchronization processing onto the PCM current-differential relay 100a can be reduced.

Second Embodiment

Figure 4:
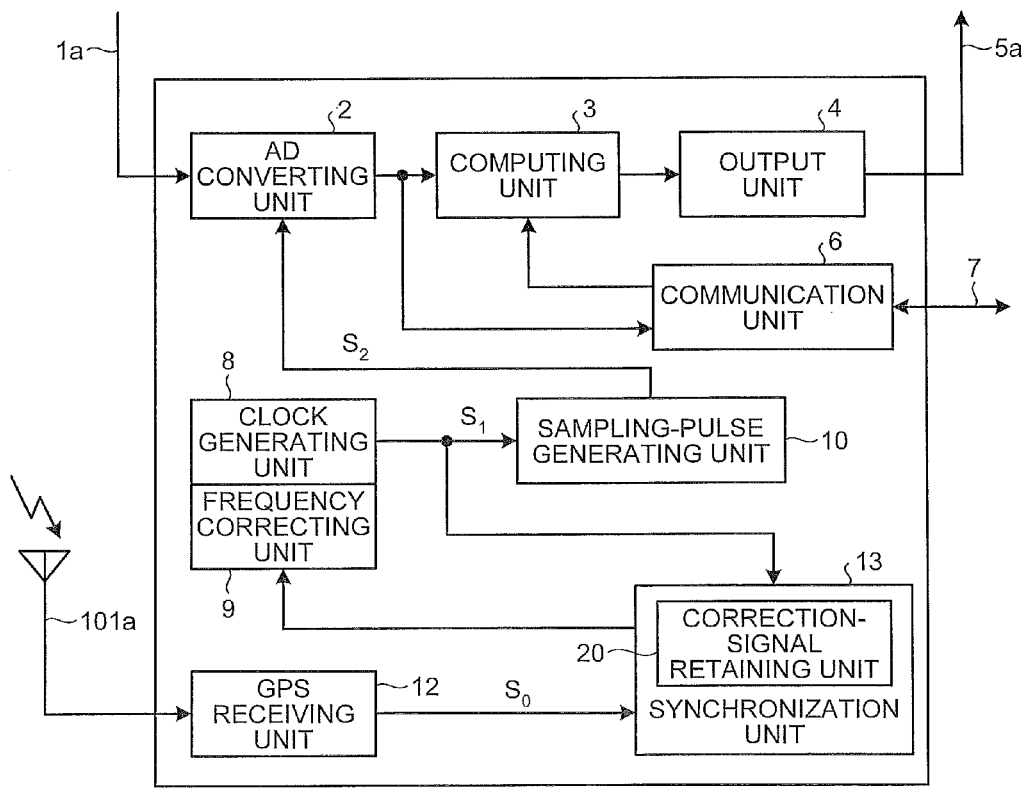
FIG. 4 is a block diagram of an example of a PCM current differential relay according to a second embodiment of the present invention.

A PCM current differential relay according to a second embodiment of the present invention is explained below in detail with reference to the drawings. FIG. 4 depicts an example configuration of the PCM current-differential relay 100a according to the second embodiment. Parts shown in FIG. 4 in common with those shown in FIG. 2 are assigned with the same reference numerals, and detailed explanations of them are omitted. The PCM current-differential relay 100b can be implemented by a configuration similar to that of the PCM current-differential relay 100a, therefore explanation of it is omitted below.

According to the first embodiment described above, when the receipt of the GPS signal by the GPS receiving unit 12 turns abnormal because of some reasons, the sampling pulse $S_2$ cannot be synchronized with the GPS time-synchronization signal. In other words, when the receipt of the GPS signal becomes abnormal, and then the GPS pulse $S_0$ supposed to be input to the other of the input ends of the phase comparator 16 is lost, the clock $S_1$ and the GPS pulse $S_0$ cannot be synchronized with respect to each other. In such case, the sampling pulse $S_2$ generated based on the clock $S_1$ loses synchronism with the GPS pulse $S_0$.

According to the second embodiment, as shown in FIG. 4, a correction-signal retaining unit 20 for retaining a correction signal is additionally provided to the PCM current-differential relay 100a, thereby coping with a case where the receipt of the GPS signal is abnormal.

Operation of the PCM current-differential relay 100a according to the second embodiment is explained below by mainly focusing on a point different from the operation according to the basic configuration described above. The correction-signal retaining unit 20 outputs and retains a correction signal for the synchronization unit 13 to correct the clock $S_1$. Every time when a new correction signal is output, the correction-signal retaining unit 20 renews the retained correction signal with the new correction signal. For example, it is conceivable that the correction-signal retaining unit 20 retains an output voltage of the LPF 18 shown in FIG. 3 by using, such as a capacitor. Not limited to this, the correction-signal retaining unit 20 can retains an output of the phase comparator 16.

When an abnormality occurs in the receipt of the GPS signal, the synchronization unit 13 supplies a correction signal retained by the correction-signal retaining unit 20 to the frequency correcting unit 9. The frequency correcting unit 9 corrects the clock $S_1$ generated by the clock generating unit 8 by using the correction signal supplied from the correction-signal retaining unit 20.

As an example, when a difference value output from the phase comparator 16 is equal to or higher than a threshold, the synchronization unit 13 controls the correction-signal retaining unit 20 not to perform the operation of renewing the correction signal retained by the correction-signal retaining unit 20 with a new correction signal. The synchronization unit 13 then outputs a correction signal retained by the correction-signal retaining unit 20 immediately before the abnormality occurs in the receipt to the GPS signal.

Accordingly, even when an abnormality occurs in the receipt of the GPS signal, the frequency correcting unit 9 can correct the clock $S_1$ by using the correction signal that is retained by the correction-signal retaining unit 20 immediately before the occurrence of the abnormality. Therefore, even when an abnormality occurs in the receipt of the GPS signal, synchronism between the clock $S_1$ and the GPS pulse $S_0$ can be maintained, thereby preventing loss of synchronism between the sampling pulse $S_2$ and the GPS pulse $S_0$.

When the receipt of the GPS signal recovers from an abnormal state to a normal state, supply of the GPS pulse $S_0$ to the phase comparator 16 is resumed. The clock $S_1$ generated by the clock generating unit 8 maintains synchronism with the GPS pulse $S_0$ according to a correction by using a correction signal retained by the correction-signal retaining unit 20, even during a period in which the receipt of the GPS signal is abnormal. Accordingly, when the receipt of the GPS signal recovers to a normal state, it does not need to synchronize the clock $S_1$ with the GPS pulse $S_0$ again. In other words, the sampling pulse $S_2$ can be promptly synchronized with the GPS time-synchronization signal without performing resynchronization processing.

According to the example of the control based on a difference value output from the phase comparator 16 described above, when the receipt of the GPS signal recovers to a normal state, and supply of the GPS pulse $S_0$ to the phase comparator 16 is resumed, a difference value output from the phase comparator 16 turns lower than the threshold. Accordingly, renewal of the correction signal retained by the correction-signal retaining unit 20 is started again, and the correction signal is retained and output.

According to the above description, it is controlled whether to output the correction signal retained by the correction-signal retaining unit 20 based on a difference value output from the phase comparator 16; however, it is not limited to the example. For example, it can be configured such that the synchronization unit 13 monitors supply of the GPS pulse $S_0$ from the GPS receiving unit 12; and when the supply of the sampling pulse $S_2$ is stopped, the correction signal retained by the correction-signal retaining unit 20 is to be output. Furthermore, it can be configured such that when the GPS receiving unit 12 detects an abnormality in the receipt of the GPS signal, the GPS receiving unit 12 notifies the synchronization unit 13 of the detection.

Figure 5:
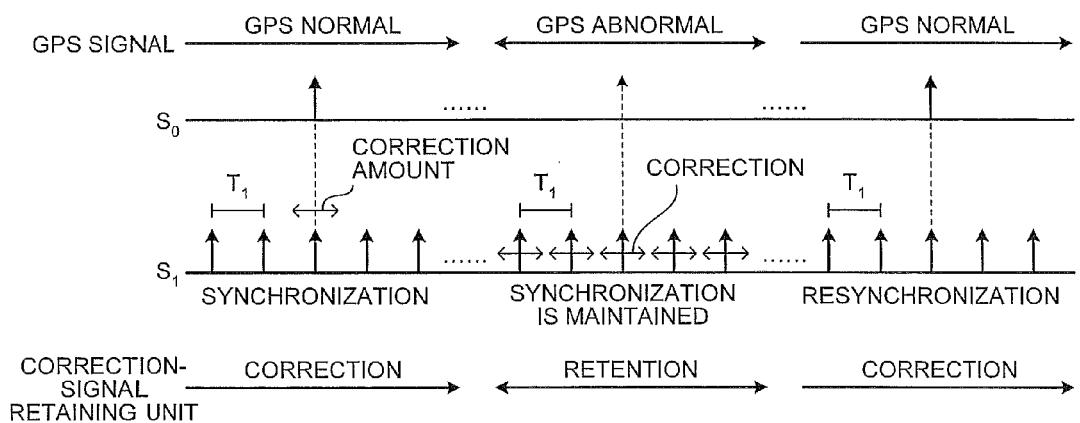
FIG. 5 is a timing chart that depicts an example of a case where a receipt of a global positioning system (GPS) signal turns abnormal from normal, and further returns to normal.

FIG. 5 is a timing chart that depicts an example of a case where the receipt of the GPS signal turns abnormal from normal, and further returns to normal. According to FIG. 5, when the receipt of the GPS signal is normal, the correction-signal retaining unit 20 outputs a correction signal generated by the synchronization unit 13 to the frequency correcting unit 9, and renews the correction signal to be retained every time when a correction signal is generated. Because the clock $S_1$ output from the clock generating unit 8 is in synchronism with the GPS pulse $S_0$, the clock $S_1$ is output with an interval $T_1$ on the basis of the GPS pulse $S_0$.

When the receipt of the GPS signal turns abnormal, the correction-signal retaining unit 20 stops renewal of the correction signal, and outputs the correction signal that has been retained to the frequency correcting unit 9. Accordingly, the timing of the clock $S_1$ output from the clock generating unit 8 becomes substantially equal to a timing of normally receiving the GPS signal. Therefore, even when the receipt of the GPS signal is abnormal, the timing of outputting the clock $S_1$ can be synchronized with a timing with which the GPS pulse $S_0$ is to be output.

After that, when the receipt of the GPS signal returns to normal, the correction-signal retaining unit 20 outputs a correction signal generated by the synchronization unit 13 to the frequency correcting unit 9. As described above, even when the receipt of the GPS signal is abnormal, synchronism between the clock $S_1$ and the GPS pulse $S_0$ is maintained. Therefore, even when the receipt of the GPS signal recovers from an abnormal state to a normal state, loss of synchronism between the clock $S_1$ and the GPS pulse $S_0$ can be avoided.

In this way, according to the second embodiment, it is configured to provide the correction-signal retaining unit 20 that retains a correction signal for correcting the frequency of the clock $S_1$ when the receipt of the GPS signal is normal, and outputs the retained correction signal when the receipt of the GPS signal is abnormal. Accordingly, even when the receipt of the GPS signal turns abnormal, synchronism between the sampling pulse $S_2$ and the GPS time-synchronization signal can be maintained.

Moreover, according to the second embodiment, it can construct a PCM current differential relay that can synchronize the GPS time-synchronization signal and the sampling pulse $S_2$ without substantially changing the contents of processing between a normal state and an abnormal state of the GPS signal. Consequently, a computation load of the synchronization processing on the PCM current differential relay can be reduced.

Furthermore, according to the second embodiment, the sampling pulse $S_2$ can be promptly synchronized with the GPS time-synchronization signal when the receipt of the GPS signal returns to a normal state from an abnormal state.

Third Embodiment

Figure 6:
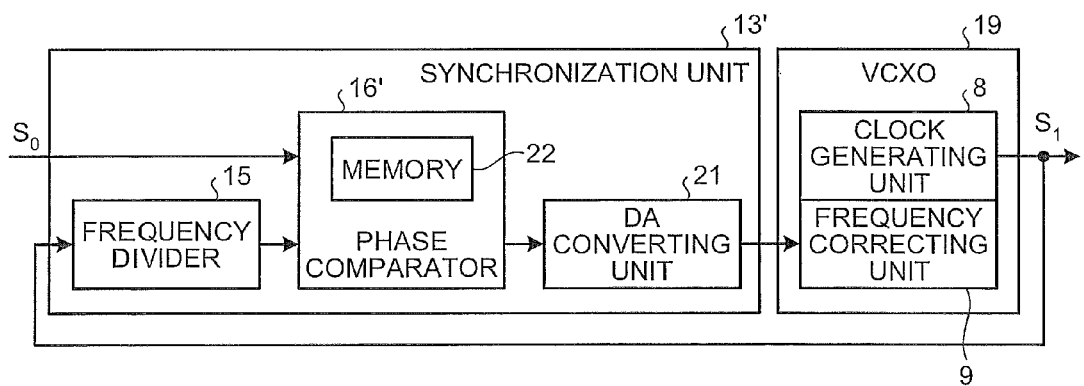
FIG. 6 is a block diagram of an example of a synchronization unit according to a third embodiment of the present invention.

A PCM current differential relay according to a third embodiment of the present invention is explained below in detail with reference to the drawings. According to the third embodiment, a configuration of the synchronization unit 13 is different from that according to the first and second embodiments described above. FIG. 6 depicts an example configuration of a synchronization unit 13' according to the third embodiment. In the third embodiment, configurations of the PCM current-differential relays 100a and 100b and the others are similar to those explained above by using FIGS. 2 and 4, therefore explanations of them are omitted below.

In the third embodiment, a phase comparator 16' in the synchronization unit 13' is configured to output a difference value of phases as a digital signal, and a memory 22 that stores therein the difference value is provided in the synchronization unit 13'. The memory 22 corresponds to the correction-signal retaining unit 20 described above. As shown in FIG. 6, a digital to analog (DA) converting unit 21 is used instead of using the charge pump 17 and the LPF 18.

Precisely, the phase comparator 16' obtains a phase difference between the GPS pulse $S_0$ and a signal that the clock $S_1$ is divided to the same frequency as the GPS pulse $S_0$ by the frequency divider 15, and outputs the phase difference as a digital signal. The digital signal indicating the phase difference is stored in the memory 22, and also output from the phase comparator 16'. A digital value stored in the memory 22 is renewed every time when a phase difference is obtained.

The digital value indicating the phase difference output from the phase comparator 16' is converted into a voltage as an analog signal by the DA converting unit 21, and supplied to the frequency correcting unit 9 if the VCXO 19. The frequency correcting unit 9 controls the clock frequency of the clock $S_1$ generated by the clock generating unit 8 based on the supplied voltage from the DA converting unit 21. As a result, the clock $S_1$ is converged on a timing on the basis of the GPS pulse $S_0$, so that synchronization between the clock $S_1$ and the GPS pulse $S_0$ is established.

When an abnormality occurs in the receipt of the GPS signal, the synchronization unit 13' converts a digital value stored in the memory 22 into a voltage with the DA converting unit 21, and supplies the voltage to the frequency correcting unit 9. The frequency correcting unit 9 corrects the clock $S_1$ generated by the clock generating unit 8 by using the voltage supplied from the DA converting unit 21 as a correction signal.

As an example, when a digital value output from the phase comparator 16' is equal to or higher than a threshold, the synchronization unit 13' controls such that the memory 22 does not renew stored contents with the digital value. The synchronization unit 13' then reads a digital value that is stored into the memory 22 immediately before the abnormality occurs in the receipt of the GPS signal, and then supplies the read value to the DA converting unit 21.

Accordingly, even when an abnormality occurs in the receipt of the GPS signal, the frequency correcting unit 9 can correct the clock $S_1$ generated by the clock generating unit 8 by using the digital value that is stored into the memory 22 immediately before the occurrence of the abnormality. Therefore, synchronism between the clock $S_1$ and the GPS pulse $S_0$ can be maintained, thereby preventing loss of synchronism between the sampling pulse $S_2$ and the GPS pulse $S_0$.

When the receipt of the GPS signal recovers to a normal state, supply of the GPS pulse $S_0$ to the phase comparator 16' is resumed. The clock $S_1$ generated by the clock generating unit 8 maintains synchronism with the GPS pulse $S_0$ according to a correction by using a digital value stored in the memory 22, even during a period in which the receipt of the GPS signal is abnormal. Accordingly, when the receipt of the GPS signal recovers to a normal state, it does not need to synchronize the clock $S_1$ with the GPS pulse $S_0$ again. In other words, the sampling pulse $S_2$ can be promptly synchronized with the GPS time-synchronization signal without performing resynchronization processing.

According to the example of the control based on a digital value output from the phase comparator 16' described above, when the receipt of the GPS signal recovers to a normal state, and supply of the GPS pulse $S_0$ to the phase comparator 16' is resumed, a digital value output from the phase comparator 16' turns lower than the threshold. Accordingly, the digital value is output from the phase comparator 16', and the digital value to be stored in the memory 22 is renewed.

In this way, the synchronization unit 13' can be implemented a simpler configuration by causing the phase comparator 16' to output a digital value, using the DA converting unit 21 as an output unit of a frequency correction signal, and providing the memory 22 that stores therein an output signal of the phase comparator 16'.

The embodiments according to the present invention are configured to correct a clock to be a reference of a predetermined timing of sampling an current amount at the first end of a power line to be protected, based on the clock and a time synchronization signal extracted from a GPS signal, thereby achieving synchronization of a sampling timing by using a GPS time-synchronization signal through simple processing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A current differential relay comprising:
    an output unit that outputs a trip current based on current amount data obtained by sampling a current amount at a first end of a power line to be protected at a predetermined timing and current amount data received from a device at a second end of the power line;
    a clock generating unit that generates a clock to be used as a reference for the predetermined timing;
    a receiving unit that receives a global positioning system signal and extracts a time synchronization signal from the global positioning system signal;
    a correction-signal generating unit that generates a correction signal for synchronizing the clock with the time synchronization signal; and
    a correcting unit that corrects the clock with the correction signal.

2. The current differential relay according to claim 1, further comprising a storing unit that stores therein the correction signal, wherein
    when the receiving unit is unable to normally receive the global positioning system signal, the correcting unit corrects the clock with the correction signal stored in the storing unit.

3. The current differential relay according to claim 1, wherein
    the correction-signal generating unit includes
        a correction-signal output unit that outputs the correction signal as a digital signal based on the clock and the time synchronization signal, and
        a converting unit that converts the correction signal output from the correction-signal output unit into an analog signal, and
    the correcting unit corrects the clock with the correction signal that is converted into the analog signal.

4. The current differential relay according to claim 2, wherein
    the correction-signal generating unit includes
        a correction-signal output unit that outputs the correction signal as a digital signal based on the clock and the time synchronization signal, and
        a converting unit that converts the correction signal output from the correction-signal output unit into an analog signal, and
    the correcting unit corrects the clock with the correction signal that is converted into the analog signal.

* * * * *